(12) United States Patent
Chen et al.

(10) Patent No.: US 10,289,910 B1
(45) Date of Patent: May 14, 2019

(54) SYSTEM AND METHOD FOR PERFORMING REAL-TIME VIDEO OBJECT RECOGNITION UTILIZING CONVOLUTIONAL NEURAL NETWORKS

(71) Applicant: HRL Laboratories, LLC, Malibu, CA (US)

(72) Inventors: Yang Chen, Westlake Village, CA (US); Deepak Khosla, Camarillo, CA (US)

(73) Assignee: HRL Laboratories, LLC, Malibu, CA (US)

(*) Notice: Subject to any disclaimer, the term of this patent is extended or adjusted under 35 U.S.C. 154(b) by 305 days.

(21) Appl. No.: 15/399,522

(22) Filed: Jan. 5, 2017

Related U.S. Application Data

(63) Continuation-in-part of application No. 14/328,402, filed on Jul. 10, 2014, now abandoned.

(Continued)

(51) Int. Cl.
*G06K 9/00* (2006.01)
*G06K 9/62* (2006.01)
(Continued)

(52) U.S. Cl.
CPC ....... *G06K 9/00664* (2013.01); *G06K 9/6276* (2013.01); *G06N 3/0472* (2013.01);
(Continued)

(58) Field of Classification Search
CPC .. G06K 9/00; G06K 9/00664; G06K 9/00671; G06K 9/62; G06K 9/6201;
(Continued)

(56) References Cited

U.S. PATENT DOCUMENTS 7,458,936 B2 * 12/2008 Zhou .................... G06K 9/6276
706/46
7,475,071 B1 * 1/2009 Liu ....................... G06K 9/6276
(Continued)

OTHER PUBLICATIONS

Oren Boiman, Eli Shechtman and Michal Irani, "In Defense of Nearest-Neighbor Based Image Classification", IEEE, 2008 IEEE Conference on Computer Vision and Pattern Recognition, 2008, pp. 1-8. (Year: 2008).*

(Continued)

*Primary Examiner* — Eric Rush
(74) *Attorney, Agent, or Firm* — Tope-McKay & Associates

(57) ABSTRACT

Described is a system for real-time object recognition. During operation, the system extracts convolutional neural network (CNN) feature vectors from an input image. The input image reflects a scene proximate the system, with the feature vector representing an object in the input image. The CNN feature vector is matched against feature vectors stored in a feature dictionary to identify k nearest neighbors for each object class stored in the feature dictionary. The matching results in a probability distribution over object classes stored in the feature dictionary. The probability distribution provides a confidence score that each of the object classes in the feature dictionary are representative of the object in the input image. Based on the confidence scores, the object in the input image is then recognized as being a particular object class when the confidence score for the particular object class exceeds a threshold.

27 Claims, 8 Drawing Sheets

Related U.S. Application Data

(60) Provisional application No. 62/274,878, filed on Jan. 5, 2016.

(51) Int. Cl.
    *G06N 99/00*     (2019.01)
    *G06N 3/08*     (2006.01)
    *G06N 5/04*     (2006.01)
    *G06N 3/04*     (2006.01)

(52) U.S. Cl.
    CPC .............. *G06N 3/084* (2013.01); *G06N 5/046* (2013.01); *G06N 99/005* (2013.01)

(58) Field of Classification Search
    CPC .. G06K 9/6215; G06K 9/6217; G06K 9/6226; G06K 9/6267; G06K 9/627; G06K 9/6276; G06K 9/78; G06T 7/70; G06N 3/0472; G06N 3/084; G06N 5/046; G06N 5/047; G06N 99/005
    See application file for complete search history.

(56) References Cited

U.S. PATENT DOCUMENTS

| | | | |
|---|---|---|---|
| 7,650,013 | B2 | 1/2010 | Dietsch |
| 8,165,407 | B1 * | 4/2012 | Khosla ................. G06K 9/4623 382/224 |
| 9,036,925 | B2 * | 5/2015 | Vaddadi ................. G06K 9/627 382/225 |
| 2012/0121161 | A1 | 5/2012 | Eade |
| 2013/0288702 | A1 | 10/2013 | Abu-Alqumsan |
| 2014/0010407 | A1 | 1/2014 | Sinha |
| 2015/0278635 | A1 * | 10/2015 | Poggio ................. G06K 9/4628 382/155 |

OTHER PUBLICATIONS

Jianping Gou, Zhang Yi, Lan Du and Taisong Xiong, "A Local Mean-Based k-Nearest Centroid Neighbor Classifier", The Computer Journal, vol. 55, No. 9, 2012, pp. 1058-1071. (Year: 2012).*

Y. Mitani and Y. Hamamoto, "A local mean-based nonparametric classifier", Elsevier, Pattern Recognition Letters, vol. 27, Issue 10, Jul. 2006, pp. 1151-1159. (Year: 2006).*

LeCun, Yann, Koray Kavukcuoglu, and Clement Farabet.(2010) "Convolutional networks and applications in vision." Circuits and Systems (ISCAS), Proceedings of 2010 IEEE International Symposium on. IEEE, 2010, pp. 253-256.

Y. LeCun, B. Boser, J. S. Denker, D. Henderson, R. E. Howard, W. Hubbard, and L. D. Jackel, (1989) "Backpropagation applied to handwritten zip code recognition," Neural Computation, 1989, pp. 541-551.

Sermanet, P., Eigen, D., Zhang, X., Mathieu, M., Fergus, R. & LeCun, Y. (2014): "OverFeat: Integrated Recognition, Localization and Detection using Convolutional Networks", International Conference on Learning Representations (ICLR 2014), Apr. 2014, pp. 1-16.

J. Deng, W. Dong, R. Socher, L.-J. Li, K. Li, and L. Fei-Fei. ImageNet: A Large-Scale Hierarchical Image Database. In CVPR09, 2009, pp. 248-255.

Ali Sharif Razavian, Hossein Azizpour, Josephine Sullivan, Stefan Carlsson, CNN Features off-the-shelf: an Astounding Baseline for Recognition, http://arxiv.org/abs/1403.6382, DeepVision CVPR 2014 workshop, pp. 512-519.

Z Chen, O Lam, A Jacobson, M Milford, "Convolutional Neural Network-based Place Recognition." arXiv preprint arXiv:1411. 1509 (2014). 2014 Australasian Conference on Robotics and Automation (ACRA 2014), Melbourne, Australia, Dec. 2014, pp. 1-8.

Murillo, A.C., et al., "Localization in Urban Environments Using a Panoramic Gist Descriptor," IEEE Transaction on Robotics, 2013, pp. 146-160.

Liu, Y., et al., "Visual Loop Closure Detection with a Compact Image Descriptor," IEEE International Conference on Intelligent Robots and Systems, 2012, pp. 1051-1056.

Cadena, C., et al., "Robust place recognition with stereo cameras," IEEE International Conference on Intelligent Robots and Systems, 2010, pp. 5182-5189.

Angell, A., et al., "Fast and incremental method for loop-closure detection using bags of visual words," IEEE Transaction on Robotics, vol. 24, No. 5, 2008, pp. 1027-1037.

Rublee, E., et al., "ORB: An efficient alternative to SIFT or SURF," IEEE International Conference on Computer Vision, 2011, pp. 2564-2571.

Leutenegger, S., et al., "BRISK: Binary Robust Invaritn Scalable Keypoints," IEEE International Conference on Computer Vision, 2011, pp. 2548-2555.

Calonder, M., et al., "BRIEF: Binary Robust Independt Elementary Features," IEEE International Conference on Computer Vision, 2010, pp. 1-14.

Office Action 1 for U.S. Appl. No. 14/328,402, dated Oct. 4, 2016.

Galvez-Lopez, D., et al., "Real-Time Loop Detection with Bags of Binary Words," IEEE International Conference on Intelligent Robots and Systems, Sep. 2011, pp. 51-58.

Response to Office Action 1 for U.S. Appl. No. 14/328,402, dated Jan. 4, 2017.

Office Action 2 for U.S. Appl. No. 14/328,402, dated May 4, 2017.

Michael Calonder, et al., "BRIEF: Computing a Local Binary Descriptor Very Fast," IEEE Transactions on Pattern Analysis and Machine Intelligence, vol. 34, No. 7, Jul. 2012, pp. 1281-1298.

Junqiu Wang, et al., "Coarse-to-tine vision-based localization by indexing scale-invariant features," IEEE Transactions on Systems, Man, and Cybernetics, Part B Cybernetics, vol. 36, No. 2, Apr. 2006, pp. 413-422.

Junjun Wu, et al., "Visual loop closure detection by matching binary visual features using locality sensitive hashing," IEEE, Proceedings of the 11th World Congress on Intelligent Control and Automation, Jul. 4, 2014, pp. 940-945.

\* cited by examiner

SYSTEM AND METHOD FOR PERFORMING REAL-TIME VIDEO OBJECT RECOGNITION UTILIZING CONVOLUTIONAL NEURAL NETWORKS

CROSS-REFERENCE TO RELATED APPLICATIONS

This is a Continuation-in-Part application of U.S. patent application Ser. No. 14/328,402, filed Jul. 10, 2014, the entirety of which is hereby incorporated by reference.

This is a non-provisional patent application of 62/274,878, filed on Jan. 5, 2016, the entirety of which is hereby incorporated by reference.

STATEMENT REGARDING FEDERALLY SPONSORED RESEARCH OR DEVELOPMENT

This invention was made with Government support under Contract Number HR0011-09-C-0001 awarded by DARPA. The government has certain rights in the invention.

BACKGROUND OF INVENTION

(1) Field of Invention

The present invention relates to a system and method for performing real-time video object recognition and, more specifically, to a system that uses a pre-trained convolutional neural network as a feature extractor for real-time object recognition.

(2) Description of Related Art

Prevalent computer vision approaches to object recognition are based on extracting certain local image descriptors (such as SIFT or SURF), then matching the descriptors between candidate images of the object and those the system has in its database. Not only are the descriptors themselves hand-crafted and difficult to optimize for the problem at hand; matching the descriptors to a database is computationally intensive. The bag-of-word (BOW) approach tries to solve the computation and matching part of the problem by condensing the discrete descriptors into a single vector using clustering trees and vector quantization. However, the performance of such systems is still highly dependent upon the design of the feature descriptors themselves. The state-of-the-art performance achieved in this line of research is represented by the deformable parts model (DPM), which adds spatial relationships to local descriptors to describe an object, and uses an optimization process to compute the matching between input and the database, which is also computationally intensive. Further, such existing state-of-the-art systems do not work well in real-time.

Thus, a continuing need exists for an optimized system for performing real-time video object recognition.

SUMMARY OF INVENTION

This disclosure provides a system for object recognition. In various embodiments, the system includes one or more processors and a memory. The memory is a non-transitory computer-readable medium having executable instructions encoded thereon, such that upon execution of the instructions, the one or more processors perform several operations, such as extracting a high-dimensional feature vector from an input image, the input image reflecting a scene proximate the system and the feature vector representing an object in the input image; matching the high-dimensional feature vector against feature vectors stored in a feature dictionary to identify k nearest neighbors for each object class stored in the feature dictionary; determining an average distance of the high-dimensional feature vector to the k nearest neighbors to generate one average distance per object class for each object class in the feature dictionary; based on the average distances, generating a probability distribution over object classes in the feature dictionary, the probability distribution being confidence score that each of the object classes in the feature dictionary are representative of the object in the input image; and recognizing the object in the input image as being a particular object class when a confidence score for the particular object class exceeds a predetermined threshold.

In another aspect, in extracting high-dimensional feature vector from the image, a convolutional neural network (CNN) feature extractor generates at least one CNN feature vector for each input image.

In yet another aspect, the input image is resized with multiple centered crops of different sizes to generate multiple resized input images.

Additionally, the multiple resized input images are processed in parallel to generate parallel probability distributions, the parallel probability distributions being combined into a single probability distribution.

In another aspect the system further performs an operation of populating the feature dictionary with CNN feature vectors for a plurality of object classes.

In another aspect, populating the feature dictionary further comprises operations of associating a class label for each of a plurality of objects in a plurality images; extracting CNN feature vectors representing the plurality of objects, and storing the CNN feature vectors and associated class labels in the feature dictionary.

Further, the plurality of images are of the plurality of objects from different angles and distances.

Additionally, populating the feature dictionary further comprises an operation of capturing random background scenery and corresponding CNN feature vectors.

In another aspect, the system is incorporated into a mobile platform, and further comprises an operation of causing the mobile platform to execute a physical operation by the mobile platform when the object in the image is recognized. The physical operation, for example, includes causing an arm on the mobile platform to grasp the object.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
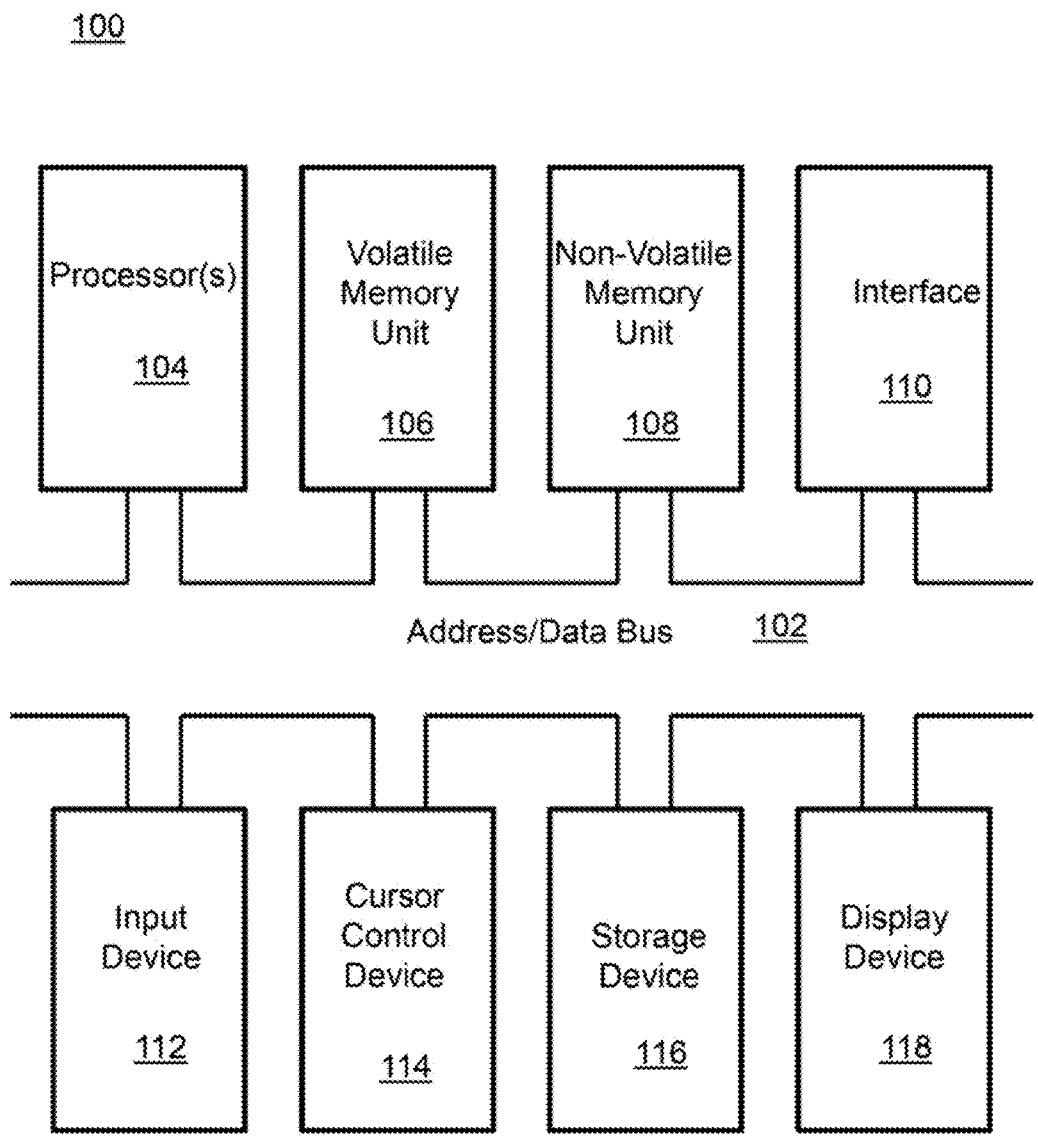
FIG. 1 is a block diagram depicting the components of a system according to various embodiments of the present invention.

The present invention relates to a system and method for performing real-time video object recognition and, more specifically, to a system that uses a pre-trained convolutional neural network as a feature extractor for real-time object recognition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. LeCun, Yann, Koray Kavukcuoglu, and Clément Farabet. (2010) "Convolutional networks and applications in vision." Circuits and Systems (ISCAS), Proceedings of 2010 IEEE International Symposium on. IEEE, 2010.
2. Y. LeCun, B. Boser, J. S. Denker, D. Henderson, R. E. Howard, W. Hubbard, and L. D. Jackel, (1989) "Backpropagation applied to handwritten zip code recognition," Neural Computation, 1989.
3. Sermanet, P., Eigen, D., Zhang, X., Mathieu, M., Fergus, R. & LeCun, Y. (2014): "OverFeat: Integrated Recognition, Localization and Detection using Convolutional Networks", International Conference on Learning Representations (ICLR 2014), April 2014.
4. J. Deng, W. Dong, R. Socher, L.-J. Li, K. Li, and L. Fei-Fei. ImageNet: A Large-Scale Hierarchical Image Database. In CVPR09, 2009.
5. Ali Sharif Razavian, Hossein Azizpour, Josephine Sullivan, Stefan Carlsson, CNN Features off-the-shelf: an Astounding Baseline for Recognition, http://arxiv.org/abs/1403.6382, DeepVision CVPR 2014 workshop.
6. Z Chen, O Lam, A Jacobson, M Milford, "Convolutional Neural Network-based Place Recognition." arXiv preprint arXiv:1411.1509 (2014). 2014 Australian Conference on Robotics and Automation (ACRA 2014), Melbourne, Australia, December 2014.

(2) Principal Aspects

Various embodiments of the invention include three "principal" aspects. The first is a system and method for performing real-time video object recognition, and more specifically, to one that makes use of a convolutional neural network as a feature extractor. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices. It should also be noted that the term "module" is used to describe a portion of the method, system, or computer program product that, when performed, operated, or executed, results in the performance of a particular function or process. Thus, the terms module and process can be used interchangeably.

Figure 2:
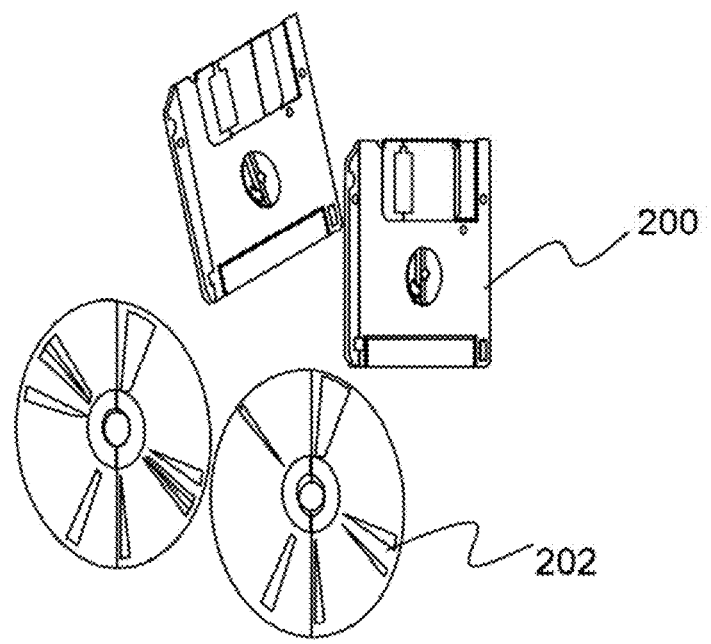
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method for performing real-time video object recognition with incremental on-line learning capability. In various embodiments, the system (1) uses a pre-trained convolutional neural network (CNN) as feature extractor, 2) learns object appearances by storing CNN features for each object class incrementally, and 3) matches incoming images by matching the CNN features against stored CNN features. Based on those matches, the system generates an object recognition class probability distribution for decision making.

The system allows for video based object recognition in real-time, even on small, low power, low cost mobile platforms (such unmanned aerial and ground vehicles (UAVs) and (UGVs)). Keys to efficient computations for this approach are the use of features learned through CNN training (rather than human-engineered image descriptors as used in majority of computer vision algorithms) and use of a k nearest neighbor (k-NN) search for matching input features with those from the learned objects (for which efficient algorithms and open-source implementations exist). This approach is also amenable for implementation on spiking neuromorphic hardware and other applications, including both stationary host platforms (e.g., factory automation and assembly lines) and mobile platforms. For example, potential applications for the present invention include autonomous navigation for any mobile platform, including unmanned aerial and ground vehicles (UAVs and UGVs), and autonomous navigation in self-driving vehicles.

(4) Specific Details of Various Embodiments

As noted above, this disclosure provides a system that uses a pre-trained convolutional neural network (CNN) as a feature extractor for real-time object recognition. For further understanding, provided below is description of a CNN feature extractor, followed by a description of the flow diagram describing its implementation in the system of the present invention.

(4.1) CNN Feature Extractor

The present invention makes use of a type of neural networks called "convolutional neural networks". A convolutional neural network (CNN) (See the List of Incorporated Literature References, Literature Reference No. 1) is a supervised deep-learning neural network with multiple layers of similarly structured convolutional feature extraction operations followed by a linear neural network (NN) classifier. CNNs are an excellent model for image recognition, because the structure allows automatic learning of image features. CNNs typically include alternating layers of simple and complex cells mimicking those found in the mammalian visual cortex. Simple cells perform template matching and complex cells pool these results to achieve invariance. Typical CNNs have several of three-layer convolution stages followed by a classifier stage which is a linear NN with one or more hidden layers. Each convolution stage has three layers: 1) a filter bank layer (convolutions) to simulate simple cells, 2) a non-linearity activation layer, and 3) feature pooling layer to simulate complex cells. The entire network can be trained using backpropagation with stochastic gradient descent (see Literature Reference No. 2).

Figure 3:
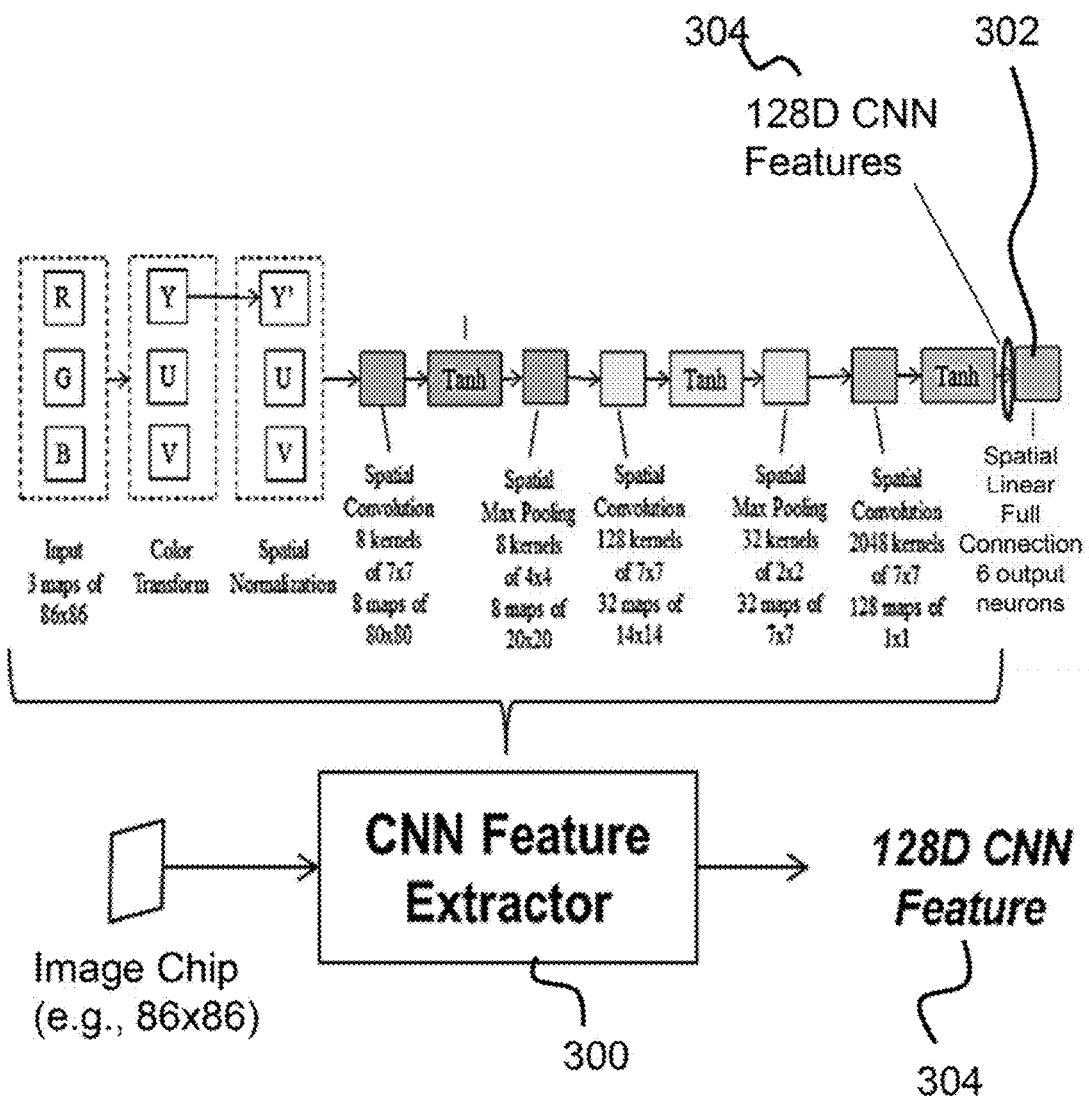
FIG. 3 is an illustration of a convolutional neural network (CNN) Feature Extractor obtained from a pre-trained CNN.

With respect to the present disclosure, CNNs are used to extract high-dimensional features, as illustrated in FIG. 3. FIG. 3 shows a typical CNN 300 with several layers of convolution (as described above) followed by a linear NN classifier 302. The CNN features 304 in question are the ones feeding the NN classifier 302 as shown in FIG. 3. In this example, the dimension of the features is 128; however, in general it can be higher or lower depending on the application or CNN used.

The CNN 300 used as a feature extractor must be trained with the NN classifier 302 as the final stage before it can be used for feature extraction purposes. The training can be done ideally using images similar to or related the intended application. For example, for this application of object recognition, the CNN 300 can be trained with images containing various objects. Training can be done with the well-known error back-propagation algorithm (see Literature Reference No. 2).

In the rest of this disclosure, CNN feature and CNN feature vector are synonymous, and will be used interchangeably.

(4.2) Object Recognition and Learning Method

Object recognition refers to the technique by which a computer analyzes a digital image containing certain objects and determines the type (or class) of objects that are present in the image. In computer vision, such tasks often require one or more of the following steps: segmentation, feature extraction, feature descriptor computation, and matching of features and/or descriptors from the image against those stored in a library of existing known objects. Such a process is extremely sensitive to the imaging conditions, such as noise and background clutter, and is heavily dependent on the performance of the feature extraction and/or descriptor, which are all hand-crafted (such as SIFT, SURF, etc.). Even though these hand-crafted feature descriptors are good at certain recognition tasks, they are not optimal in the sense that they cannot be easily adapted to operate optimally under a variety of conditions. Therefore, for any specific task, one must try to tune the feature descriptor parameters.

Alternatively, a neural network (NN) approach to machine learning presents a completely bottom-up approach, where the NN can be trained from given data to perform a certain task (such as classification) by which the NN itself learns to extract certain features of the given data for classification. In recent years, such features extracted from NN have been shown to work in other domains than what the original network was trained in. For example, the open-source OverFeat (see Literature Reference No. 3) is a deep convolution neural network (CNN) trained using ImageNet dataset (see Literature References No. 4).

Advancing the state of the art, the system of the present disclosure was developed in which CNN features are used directly for learning and object recognition. The advantage of this approach is that it is simple and fast, since it does not require iterative training as required by previous approaches (see Literature Reference No. 5), and that the learning can be carried out on demand and on the spot, and incrementally.

Figure 4:
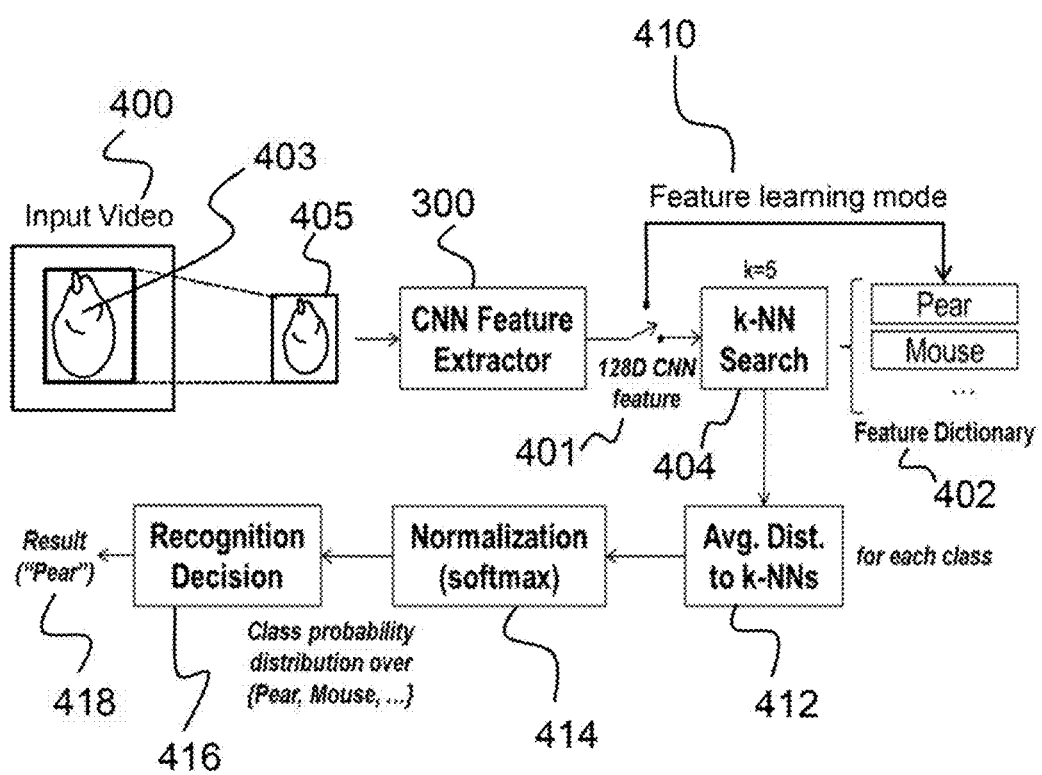
FIG. 4 is an illustration of a system block diagram of object recognition and learning using CNN features according to various embodiments of the present invention.

A block diagram of the system of the present disclosure is illustrated in FIG. 4. The system works in two modes: learning and recognition. In the learning mode, input video images 400 are processed through the CNN Feature Extractor 300, with the resulting high-dimensional feature vectors 401 being stored in a Feature Dictionary 402 with the given training labels (e.g., "Pear"). In the recognition phase, the CNN feature vectors 401 computed from the video images 400 are used by a k nearest neighbor (k-NN) search module 404 to match against those stored in the Feature Dictionary 402 for recognition. Provided below are further details regarding the process of this disclosure (4.3) CNN Feature Extraction The CNN Feature Extractor 300 module is shared between the learning mode and recognition mode of the system. The input video images 400 are cropped and scaled (resulting in a resized image 405) according to the requirements of the CNN 300. As an example, in FIG. 3, input color images of 86×86 pixels are required by the CNN 300. Therefore if a CNN 300 is used for feature extraction, the original input image 400 will be resized to a 86×86 pixel resized image 405.

The cropping of the original video images 400 has two purposes. The first is to reduce background clutter, the second is to provide input images to the CNN features with the objects at different sizes relative to the required input size (e.g., 86×86 pixels) by making multiple different sized crops before resizing the image. This is done in the recognition mode as further detailed below. In learning mode, a single crop is typically made at 75% of the shorter side of the original input image 400. For example, if the input video size is 640×480 pixels, a 360×360 pixel (480*0.75=360) centered crop is taken and resized to 86×86 pixels.

(4.4) Feature Learning Mode

In feature teaming 410 mode, an object 403 of which the system is intended to learn and recognize later is taken and placed in front of the video camera. Video images 400 of the object 403 are further taken while computing the CNN features 401 in the CNN Feature Extractor 400. The CNN features 401 are stored in the Feature Dictionary 402 with a given class label corresponding to the object 403. The video camera is aimed at the object 403 from different angles, and the distance to the object 403 is varied during learning 410 to accommodate variations in viewing conditions at the recognition stage.

To achieve robustness in recognition to background or lighting conditions, multiple learning sessions can be carried out for a single object, with the CNN features 401 being added to the Feature Dictionary 402 for the same object to populate the Feature Dictionary 402.

Since video cameras usually operate at 30 frames/second, and the difference between consecutive image frames may be minimal, a few frames can be skipped in computing the CNN features 401 during learning 410. For example, CNN features 401 can be computed on every 5th frame of the input video 400 while moving the camera around the object. Typically, several dozen to low hundreds of images are taken in learning 410 for each object.

In feature learning 410 mode, only the CNN Feature Extractor 300 and Feature Dictionary 402 modules of FIG. 4 are in operation, with the rest of the modules sitting idle. It should be noted that the features extracted from images by the Feature Extractor 300 are added to the Feature Dictionary 402 using any suitable technique, a non-limiting example of which includes being organized as a kD-trees.

(4.5) Feature Dictionary

The Feature Dictionary 402 has two functions, storing the CNN features 401 and the associated object identity (i.e., name string or label) during learning, and providing the search capability in recognition (see k-NN Search below).

In the learning 410 mode, a set of CNN features 401 from each learning 410 session is pushed into the Feature Dictionary 402 at a time, providing incremental learning capability. Furthermore, CNN features 401 of the same object are put into the same database associated with the same object name or label. Therefore, after learning 410, the Feature Dictionary 402 contains a set of one or more objects the system has learned, and for each object, a set of CNN features 401 learned in one or more learning 410 sessions as outlined above in the Feature Learning Mode section.

(4.6) Recognition Mode

In the recognition mode, the system processes the incoming images 400, extracts CNN features 401 from them, and sends the features 401 to a k-NN Search module 406 for feature matching with the Feature Dictionary 402. The result of feature matching is then further processed by the downstream modules to form a probability distribution for recognition decision, which is described in detail below. In the most general configuration of this invention, the system can provide a decision as to whether the image from the input video represents one of the objects known to the system, or just a random background scene, updated in real-time with the video input.

(4.7) k-NN Search

The k nearest neighbor (k-NN) search module 404 implements a feature matching function while in the recognition mode. For each incoming CNN feature 401 from the CNN Feature Extractor 300, the k-NN search module 404 returns k nearest neighbors for each object in the Feature Dictionary 402, where k is typically a small integer value (e.g., 5, etc.). For example, if the Feature Dictionary 402 contains features for objects "Pear", "Mouse", and "Cap", then the k-NN search module 404 will returns 5 nearest neighbors (CNN features) for each of "Pear", "Mouse", and "Cap". The distance metric for determining "closeness" is the squared Euclidean distance of the two CNN feature vectors. For example, if v is the feature vector of the image of an object to be recognized, and v' the nearest neighbor of v within the feature dictionary, then the distance metric is $d=\|v-v'\|^2$, where $\|\cdot\|$ represents the Euclidean norm operator.

(4.8) Average Distance to k-NN

With the k-NN results (i.e., the k nearest neighbors and their corresponding distance metrics), an average distance module 412 determines the average of the (squared) distance of the input CNN feature 401 to the k of the nearest neighbors. This results in one average distance per object for objects in the Feature Dictionary 402. For example, if v is the feature vector of the image of an object to be recognized, and vi, i=1, . . . , k, are the k nearest neighbors of v, then average distance is $d_{average}=1/k \sum_{i=1}^{k}(\|v-vi\|^2)$.

(4.9) Normalization

A normalization module 414 or process computes the confidence that represents the identity of the object 403 in the video 400 whose CNN features 401 are being processed by the system. This confidence is represented as a probability distribution over the set of objects represented in the Feature Dictionary 402. The average distances from the Average Distance module 412 are taken, and a normalization 414 step is performed to compute the desired probability distribution, as follows:

$$p_i = \frac{\exp(-\alpha \cdot d_i)}{\sum_i \exp(-\alpha \cdot d_i)}, \quad (1)$$

where i=1, . . . , N, with N the number of objects (i.e., number of classes) in the Feature Dictionary 402, $d_i$ is the average (squared) distance measure computed for object i from Average Distance module 412, $\alpha$ is a constant chosen depending on the magnitude of CNN feature vector components. In example experiments, the CNN feature vector components varied approximately between −10.0 to 10.0, and with $\alpha=0.1$ being chosen. The above equation provides a probability distribution $\{p_i\}$, i=1, . . . , N, $\Sigma_i(p_i)=1.0$.

(4.10) Robust Recognition

At the end of the processing steps for the recognition mode, a probability distribution $\{p_i\}$ is obtained that represents the likelihood of the input image containing the objects i=1, . . . , N. As a non-limiting example, the system makes a recognition decision 416 and declares 418 the object to be i if and only if $$i=\operatorname{argmax}_i(p_i), \text{and } p_i \geq 0.5. \quad (2)$$

For more robust recognition performance, additional modifications can be made to the processing flow described above.

(4.11) Multiple Centered-Crops

As noted above, additional modifications can be made to further enhance recognition performance. For example, instead of taking a single centered crop (i.e., resulting in the resized image 405) of the video image 400 as input as described in the section entitled, "CNN Feature Extraction", multiple centered crops of various sizes can be taken. For example, three centered crops of various sizes can be taken. These cropped images are processed in parallel through the system to arrive at the probability distributions after normalization. These parallel processed probability distributions are subsequently combined by multiplying the probability distributions component-wise, followed by normalization (by dividing by the sum of the component-wise multiplication results) to get a single combined probability distribution whose components sum to 1.0. Then the combined probability distribution is used for a recognition decision according to Eq. (2) above.

Figure 5:
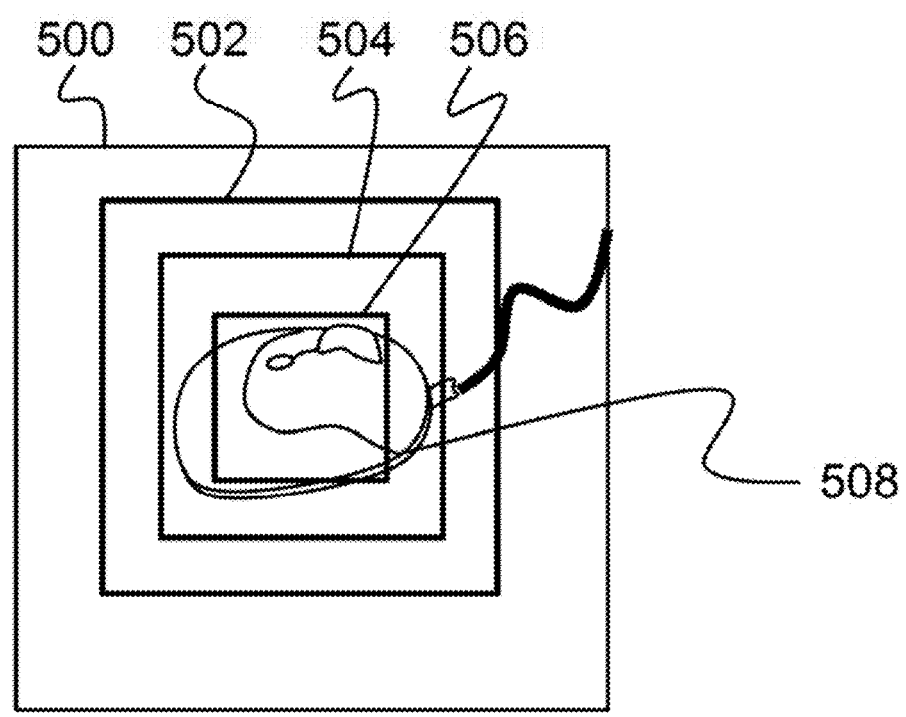
FIG. 5 is an illustration depicting a process where multiple centered crops are used to resize an image.

The multiple (e.g., three) centered crops of the input image can be obtained at various sizes relative to the original input image. For example, {0.75, 0.5, 0.35} can be performed, meaning each of the centered crop having the size on each side equal to the 0.75, 0.5, and 0.35 times the shorter side of the original input image. FIG. 5, for example, is an illustration depicting an original input image 500 with three centered crops 502, 504, 506 centered on the object 508 (in this case a computer mouse). Using multiple centered crops of the input accounts for the size variation of the object in the input, compared with the ones used in computing CNN features during learning which is only at a single size. This approach results in more robust system performance against the changes in apparent size of the object in the input video, allowing the system to recognize the object from non-ideal distances.

(4.12) Background Class

Another modification to the system is to add a special object class during learning. In addition to having every object intended for recognition in the recognition phase in the Feature Dictionary 402, an object type is also added to the "background" by aiming the video camera at some "random" background scene during learning. The object type is special in the following sense: a) during learning, the video camera and system will capture various non-object scenes and corresponding CNN feature vectors (i.e., scenes or objects that are not any objects intended for learning and recognition); b) during recognition, if the "background" object class happens to be the recognition result using the normal process (see Eq. (2)), the recognition result is not declared since the result is not of particular interest to the user.

Adding a background class helps in improving the system robustness because it gives the decision process an alternative interpretation of the object in the input image when an unknown object or scene is presented, rather than forcing the system to choose one of the known objects in the Feature Dictionary 402.

(4.13) Reduction to Practice

Figure 6:
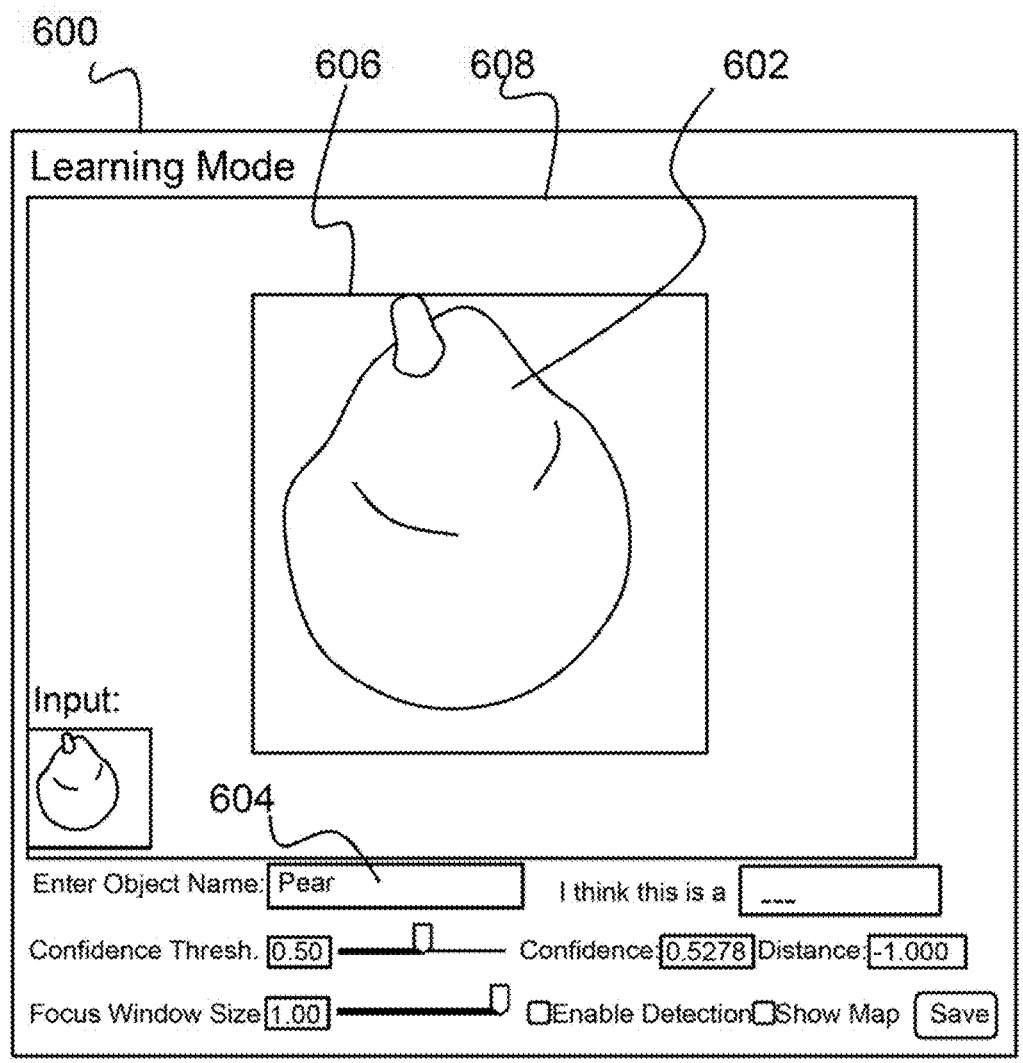
FIG. 6 is an illustration depicting an example user interface in a learning mode.
Figure 7:
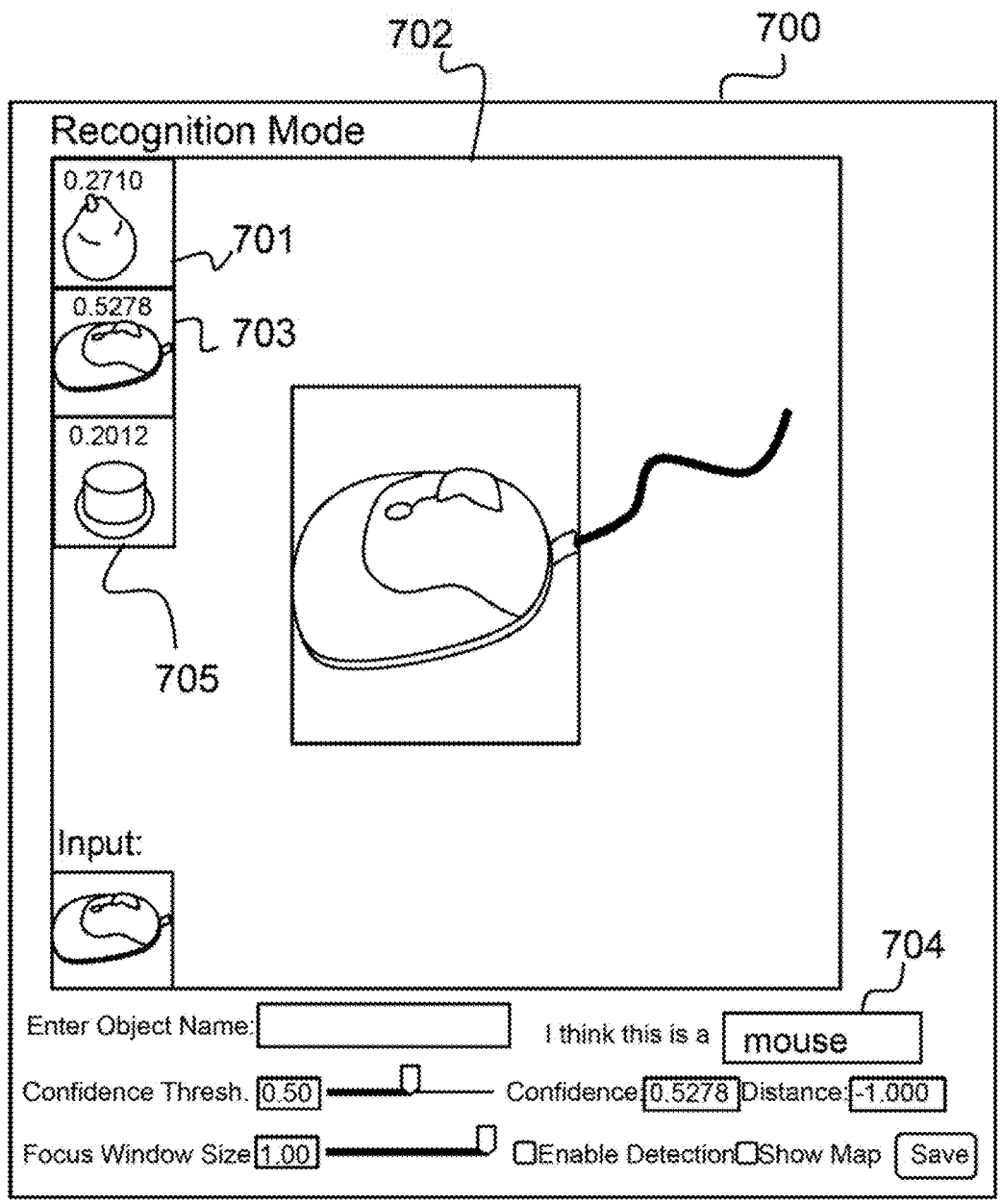
FIG. 7 is an illustration depicting an example user interface in a recognition mode.
Figure 8:
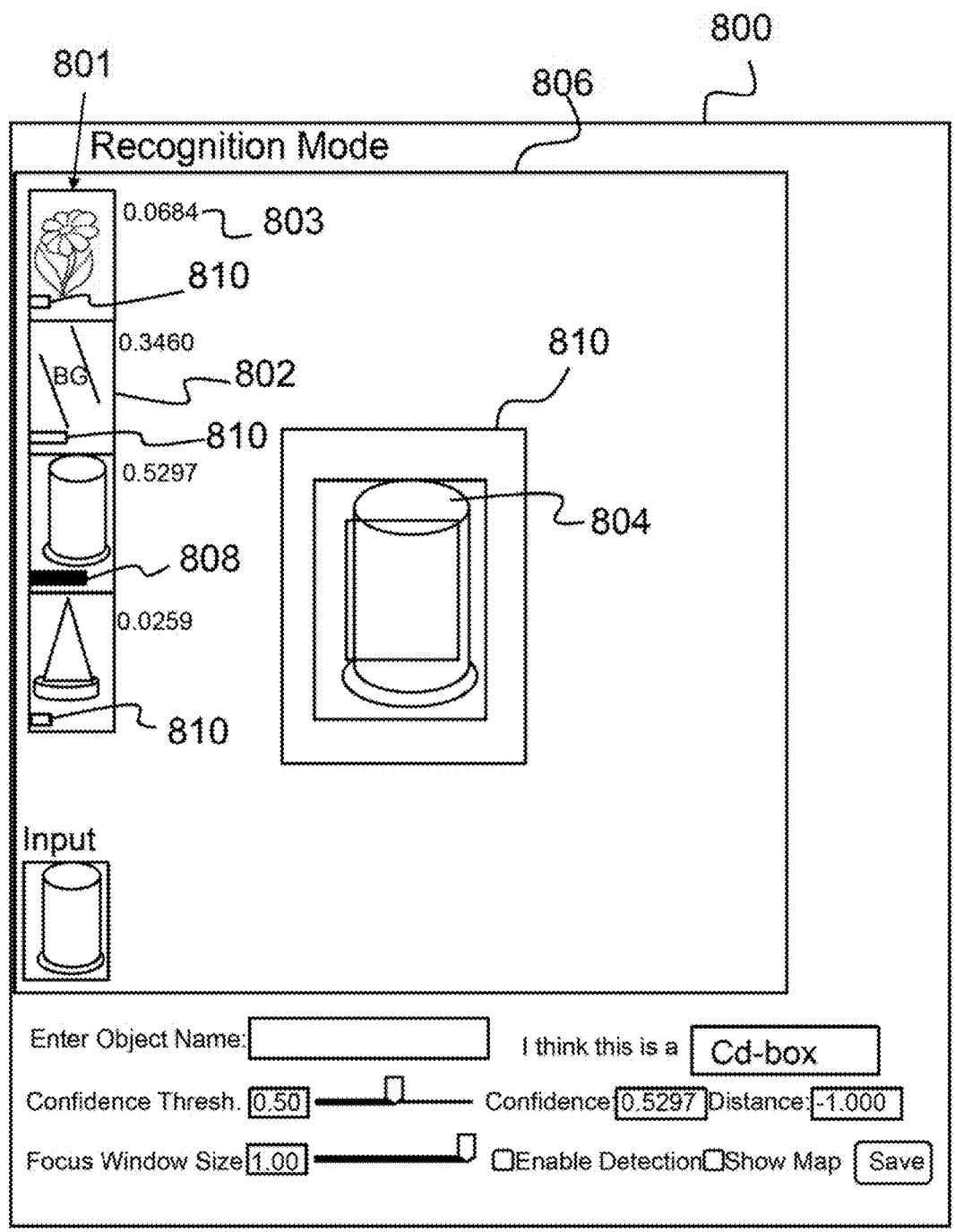
FIG. 8 is an illustration depicting an example user interface in a recognition mode where a background class is included.

The present invention for object recognition and learning using CNN features has been implemented and tested by developing a computer program (the App) with an interface, an example of which is shown in FIGS. 6, 7, and 8. The App works in two different modes, learning and recognition, as described in this invention.

In the learning mode and as shown in FIG. 6, a user accesses the interface 600 and enters the name of object 602 in the "Enter Object Name" entry field 604, which triggers the learning process. In this example, a single centered crop 606 is obtained in the input video image 608 to be processed to compute CNN features.

Alternatively, an example of user interface 700 while in the recognition mode is shown in FIG. 7. In the recognition mode, a camera (e.g., USB camera) is connected to the computer (such as a laptop computer) to provide the video input image 702, with the recognition results 704 according to Eq. (2) being shown in a user interface 700 (as exceeding the selected confidence threshold). In this example, the Feature Dictionary contains three object classes (Pear 701, Mouse 703, and Cap 705) as shown in the top-left, and the system has identified that the object in the current video image is "Mouse" with a confidence of 0.5278 that exceeds the selected threshold of 0.5. The recognition result 704 is shown in the bottom right of the interface 700.

FIG. 8 depicts another example of the App and its user interface 800. In this case, multiple centered crops 810 are used as input to the processing flow. Further, the Feature Dictionary in this example contains four object classes 801 including the background class (denoted as "BG") 802 as shown in the icons to the top-left of the display (along with their respective confidence values 803). The CD case 804 in the center of the input image 806 is recognized as "cd-box" (as it was called during learning), and the corresponding icon (the 3rd from top-left) has a solid (or green, etc.) confidence bar 808 (indicating that the probability for "cd-box" has exceeded the selected threshold of 0.5) shown at the bottom edge of the icon, while the other icons show white (or red, orange, etc.) bars 810. In other words, an indicator can be used to assist an operator in quickly identifying if the recognition result has exceeded the threshold. For example, colored confidence bars can be used. As the USB camera is moved around and aimed at various objects, the recognition result (confidence bars and the name of the objects) will be shown in real-time. If there is no recognized object near the center of the video image, no declaration is made. For example, the display field in the lower-right will simply show two dashes ("- -").

As can be appreciated, the system described herein can be implemented in a variety of applications. For example, in autonomous missions where an autonomous mobile platform is deployed in a field, the mobile platform can be automatically actuated or otherwise caused to perform a physical action or operation when the system recognizes a particular object. For example, the robot can be caused to grasp a particular object if the confidence threshold of the object exceeds a predetermined threshold and if the object is pre-designated as a sought after object. As a non-limiting example, to identify and neutralize a harmful object (e.g., an explosive or weapon), the autonomous robot may be taught to identify a particular weapon (e.g., explosive device) during the learning mode. During operation in the field and while in recognition mode, if the autonomous robot recognizes an explosive device that exceeds a predetermined confidence threshold (e.g., probability greater than 0.50), then the autonomous robot is actuated to grasp the object (e.g., with a robotic arm) and then navigate to an explosive containment vessel, where the autonomous robot then releases and disposes of the object.

Another non-limiting example includes fruit picking to cause the robot to grasp recognized fruit. This can also be applied to obstacle avoidance or navigation in general. That is, a robot can be taught to avoid a specific type of object in the field of view (because it is dangerous, for example), or use the recognized object as landmarks to go by or otherwise to cause the autonomous platform or robot to move by, near, or around.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for object recognition, the system comprising: one or more processors and a memory, the memory being a non-transitory computer-readable medium having executable Instructions encoded thereon, such that upon execution of the instructions, the one or more processors perform operations of:
   extracting a high-dimensional feature vector from an input image, the input image reflecting a scene proximate the system and the feature vector representing an object in the input image;
   matching the high-dimensional feature vector against feature vectors stored in a feature dictionary to identify k nearest neighbors for each object class stored in the feature dictionary;
   determining an average distance of the high-dimensional feature vector to the k nearest neighbors for each object class to generate one average distance per object class for each object class in the feature dictionary;
   based on the average distances, generating a probability distribution over object classes in the feature dictionary, the probability distribution being a confidence score that each of the object classes in the feature dictionary are representative of the object in the input image; and
   recognizing the object in the input image as being a particular object class when a confidence score for the particular object class exceeds a predetermined threshold;
   wherein the system is incorporated into a mobile platform, and further comprising an operation of causing the mobile platform to execute a physical operation by the mobile platform when the object in the image is recognized.

2. The system as set forth in claim 1, wherein in extracting high-dimensional feature vector from the image, a convolutional neural network (CNN) feature extractor generates at least one CNN feature vector for each input image.

3. The system as set forth in claim 2, wherein the input image is resized with multiple centered crops of different sizes to generate multiple resized input images.

4. The system as set forth in claim 3, wherein the multiple resized input images are processed in parallel to generate parallel probability distributions, the parallel probability distributions being combined into a single probability distribution.

5. The system as set forth in claim 4, further comprising an operation of populating the feature dictionary with CNN feature vectors for a plurality of object classes.

6. The system as set forth in claim 5, wherein populating the feature dictionary further comprises operations of:
   associating a class label for each of a plurality of objects in a plurality images;
   extracting CNN feature vectors representing the plurality of objects;
   storing the CNN feature vectors and associated class labels in the feature dictionary.

7. The system as set forth in claim 6, wherein the plurality of images are of the plurality of objects from different angles and distances.

8. The system as set forth in claim 7, wherein populating the feature dictionary further comprises an operation of capturing random background scenery and corresponding CNN feature vectors.

9. The system as set forth in claim 8, wherein the physical operation includes causing an arm on the mobile platform to grasp the object.

10. A computer program product for object recognition, the computer program product comprising:
    a non-transitory computer-readable medium having executable instructions encoded thereon, such that upon execution of the instructions by one or more processors, the one or more processors perform operations of:
    extracting a high-dimensional feature vector from an input image, the input image reflecting a scene proximate a mobile platform and the feature vector representing an object in the input image;
    matching the high-dimensional feature vector against feature vectors stored in a feature dictionary to identify k nearest neighbors for each object class stored in the feature dictionary;
    determining an average distance of the high-dimensional feature vector to the k nearest neighbors for each object class to generate one average distance per object class for each object class in the feature dictionary;
    based on the average distances, generating a probability distribution over object classes In the feature dictionary, the probability distribution being a confidence score that each of the object classes in the feature dictionary are representative of the object in the input image;
    recognizing the object in the input image as being a particular object class when a confidence score for the particular object class exceeds a predetermined threshold; and
    further comprising an operation of causing the mobile platform to execute a physical operation by the mobile platform when the object in the image is recognized.

11. The computer program product as set forth in claim 10, wherein in extracting high-dimensional feature vector from the image, a convolutional neural network (CNN) feature extractor generates at least one CNN feature vector for each input image.

12. The computer program product as set forth in claim 11, wherein the input image is resized with multiple centered crops of different sizes to generate multiple resized input images.

13. The computer program product as set forth in claim 12, wherein the multiple resized input images are processed in parallel to generate parallel probability distributions, the parallel probability distributions being combined into a single probability distribution.

14. The computer program product as set forth in claim 13, further comprising instructions for causing the one or more processors to perform an operation of populating the feature dictionary with CNN feature vectors for a plurality of object classes.

15. The computer program product as set forth in claim 14, wherein populating the feature dictionary further comprises operations of:
 associating a class label for each of a plurality of objects in a plurality images;
 extracting CNN feature vectors representing the plurality of objects;
 storing the CNN feature vectors and associated class labels in the feature dictionary.

16. The computer program product as set forth in claim 15, wherein the plurality of images are of the plurality of objects from different angles and distances.

17. The computer program product as set forth in claim 16, wherein populating the feature dictionary further comprises an operation of capturing random background scenery and corresponding CNN feature vectors.

18. The computer program product as set forth in claim 17, wherein the physical operation includes causing an arm on the mobile platform to grasp the object.

19. A computer implemented method for object recognition, the method comprising an act of:
 causing one or more processes to execute instructions encoded on a non-transitory computer-readable medium, such that upon execution, the one or more processors perform operations of:
  extracting a high-dimensional feature vector from an input image, the input image reflecting a scene proximate a mobile platform and the feature vector representing an object in the input image;
  matching the high-dimensional feature vector against feature vectors stored in a feature dictionary to identify k nearest neighbors for each object class stored in the feature dictionary;
  determining an average distance of the high-dimensional feature vector to the k nearest neighbors for each object class to generate one average distance per object class for each object class in the feature dictionary;
  based on the average distances, generating a probability distribution over object classes in the feature dictionary, the probability distribution being a confidence score that each of the object classes in the feature dictionary are representative of the object in the input image;
  recognizing the object in the input image as being a particular object class when a confidence score for the particular object class exceeds a predetermined threshold; and
 further comprising an operation of causing the mobile platform to execute a physical operation by the mobile platform when the object in the image is recognized.

20. The method as set forth in claim 19, wherein in extracting high-dimensional feature vector from the image, a convolutional neural network (CNN) feature extractor generates at least one CNN feature vector for each input image.

21. The method as set forth in claim 20, wherein the input image is resized with multiple centered crops of different sizes to generate multiple resized input images.

22. The method as set forth in claim 21, wherein the multiple resized input images are processed in parallel to generate parallel probability distributions, the parallel probability distributions being combined into a single probability distribution.

23. The method as set forth in claim 22, further comprising instructions for causing the one or more processors to perform an operation of populating the feature dictionary with CNN feature vectors for a plurality of object classes.

24. The method as set forth in claim 23, wherein populating the feature dictionary further comprises operations of:
 associating a class label for each of a plurality of objects in a plurality images;
 extracting CNN feature vectors representing the plurality of objects;
 storing the CNN feature vectors and associated class labels in the feature dictionary.

25. The method as set forth in claim 24, wherein the plurality of images are of the plurality of objects from different angles and distances.

26. The method as set forth in claim 25, wherein populating the feature dictionary further comprises an operation of capturing random background scenery and corresponding CNN feature vectors.

27. The method as set forth in claim 26, wherein the physical operation includes causing an arm on the mobile platform to grasp the object.

* * * * *